United States Patent
Hanselmann-Willi et al.

(10) Patent No.: US 10,488,290 B2
(45) Date of Patent: *Nov. 26, 2019

(54) SENSOR UNIT INCLUDING A MEASURING CELL, A HOUSING AND AT LEAST ONE ACCESS CHANNEL

(71) Applicant: INFICON GMBH, Bad Ragaz (CH)

(72) Inventors: Hansjakob Hanselmann-Willi, Oberschan (CH); Francesco Scuderi, Chur (CH)

(73) Assignee: INFICON GMBH, Bad Ragaz (CH)

(*) Notice: Subject to any disclaimer, the term of this patent is extended or adjusted under 35 U.S.C. 154(b) by 40 days.

This patent is subject to a terminal disclaimer.

(21) Appl. No.: 15/895,796

(22) Filed: Feb. 13, 2018

(65) Prior Publication Data
US 2018/0172538 A1    Jun. 21, 2018

Related U.S. Application Data

(63) Continuation of application No. 14/900,993, filed as application No. PCT/EP2013/064211 on Jul. 5, 2013, now Pat. No. 9,927,315.

(51) Int. Cl.
| | | |
|---|---|---|
| G01L 9/00 | (2006.01) | |
| G01L 19/06 | (2006.01) | |
| G01L 19/14 | (2006.01) | |

(52) U.S. Cl.
CPC ........ *G01L 19/0681* (2013.01); *G01L 9/0072* (2013.01); *G01L 9/0076* (2013.01); *G01L 19/06* (2013.01); *G01L 19/14* (2013.01); *G01L 19/143* (2013.01)

(58) Field of Classification Search
None
See application file for complete search history.

(56) References Cited

U.S. PATENT DOCUMENTS

| | | | |
|---|---|---|---|
| 7,124,640 B1 * | 10/2006 | Miller | ............... G01L 19/04 73/708 |
| 2013/0327151 A1 | 12/2013 | Berlinger et al. | |
| 2015/0346044 A1 | 12/2015 | Mullis et al. | |

FOREIGN PATENT DOCUMENTS

| | | |
|---|---|---|
| DE | 11 2006 001662 T5 | 5/2008 |
| WO | 2007/019714 A1 | 2/2007 |
| WO | 2008/154760 A1 | 12/2008 |

OTHER PUBLICATIONS

International Search Report of PCT/EP2013/064211, dated Apr. 22, 2014.
International Preliminary Report on Patentability and Written Opinion of PCT/EP2013/064211, dated Jan. 5, 2016.

* cited by examiner

*Primary Examiner* — Andre J Allen
(74) *Attorney, Agent, or Firm* — Notaro, Michalos & Zaccaria P.C.

(57) ABSTRACT

A sensor unit including a measuring cell with a section-wise heat-conducting surface, a housing in which the measuring cell for the most part is contained, and an access channel to the measuring cell. The sensor unit includes a cavity that is confined for the most part by an outer surface of the measuring cell and by a wall of the housing facing towards the surface of the measuring cell. The cavity is closed in itself.

15 Claims, 3 Drawing Sheets

SENSOR UNIT INCLUDING A MEASURING CELL, A HOUSING AND AT LEAST ONE ACCESS CHANNEL

CROSS REFERENCE TO RELATED APPLICATIONS

This is a continuation of application Ser. No. 14/900,993, filed Dec. 22, 2015, which is a 371 application of international application PCT/EP2013/064211, filed Jul. 5, 2013, which are both incorporated herein by reference and which priority claim is repeated here.

FIELD AND BACKGROUND OF THE INVENTION

The invention addressed herein relates to a sensor unit according to the preamble of claim 1.

The following techniques are used in the semiconductor industry for production of semiconductor components: chemical vapor deposition (CVD), physical vapor deposition (PVD), implanting and (dry) etching processes. Typical pressure ranges for the used processes lie e.g. in the range of $10^{-4}$ to 10 mbar. Thereby e.g. sensor units with a capacitive membrane measuring cell are employed.

Especially with so-called ALD—(Atomic Layer Deposition) processes pressure measurements need to be carried out at temperatures of 300° Celsius or higher.

A sensor unit with a capacitive membrane measuring cell (CDG—Capacitance Diaphragm Gauge) is based on the elastic deformation of a thin membrane that is suspended above a massive body and hence separates two spaces from each other. A pressure difference between these spaces leads to a bending (deflection) of the membrane, whereby the membrane at a high pressure difference deflects stronger than at a low pressure difference. Metallic electrodes are provided in the region of the gap on the membrane and on the base body that is opposite to the membrane in order to form a capacitor. Naturally, the capacitance of the capacitor is dependent on the distance between the membrane and the base body. The change of capacitance of this capacitor is therefore a measure for the change of pressure. Sensor units of this type are known and described e.g. in WO 2007/019714 A1.

The relatively high temperatures used in the mentioned processes lead to corresponding constructional measures at the sensor units. That way, on the one hand attention must be paid that the electronic components required for processing the measured values do not overheat due to their proximity to the measuring cell, on the other hand the sensor units should show a certain compactness for a simple handling. Furthermore it has to be considered that in many cases a heater is heating the measuring cell to a temperature that lies higher than a condensation temperature of involved substances of a vacuum process to be measured. The temperature of the measuring cell thereby lies for example at least 10° C. above the condensation temperature. The involved substances are often very aggressive and the heating is an effective measure for keeping the substances away from sensitive parts of the measuring cell. With that it can be achieved that the measuring cell reliably works for a long period with high precision and high reproducibility.

Although the known sensor units preponderantly fulfill the previously explained requirements, yet it has turned out that the production of the known sensor units is elaborate and thus expensive.

SUMMARY OF THE INVENTION

Therefore, an object of the present invention is to specify a sensor unit that has a simpler construction and can be produced more cost-effective.

This object is achieved by the features listed in the characterizing part of claim 1. Advantageous embodiments are specified in the dependent claims.

The present invention relates to a sensor unit that comprises:
  a measuring cell with at least section-wise heat-conducting surface,
  a housing, in which the measuring cell for the most part is contained,
  at least an access channel to the measuring cell, and
  a cavity that is confined for the most part by an outer surface of the measuring cell and a wall of the housing facing towards the surface of the measuring cell,
wherein the cavity is closed in itself.

The sensor unit according to the invention can be produced extremely easy, as no isolation material needs to be employed between measuring cell and housing. The result is a simpler construction and correspondingly lower costs for production of the sensor unit according to the invention.

An embodiment of the present invention consists in that the at least one access channel is guided through the housing in an area that consists of a polymer, wherein the polymer preferably is PPS polyphenylene sulfide.

Further embodiments of the sensor unit according to the invention consist in that the housing consists at least in sections of a heat conducting material, wherein the heat conducting material preferably is a metal, in particular aluminum.

Still further embodiments of the sensor unit according to the invention consist in that the cavity is gas-tightly enclosed.

Still further embodiments of the sensor unit according to the invention consist in that the cavity completely comprises the measuring cell except for the at least one access channel.

Still further embodiments of the sensor unit according to the invention consist in that the at least one access channel is guided through the housing.

Still further embodiments of the sensor unit according to the invention consist in that the measuring cell comprises at least one heating element.

Still further embodiments of the sensor unit according to the invention are characterized by
  an extension of the housing for receiving an electronics module, wherein the extension of the housing is connected with the housing, and
  a cover element that is provided between the housing and the extension of the housing, wherein the covering element is spaced from the measuring cell.

Still further embodiments of the sensor unit according to the invention consist in that the electronics module is spaced from the thermally insulating cover element.

Still further embodiments of the sensor unit according to the invention consist in that the cover element consists of a thermally insulating material, preferably a polymer.

Still further embodiments of the sensor unit according to the invention consist in that the extension of the housing at least in sections consists of a heat-conducting material, preferably a metal.

Still further embodiments of the sensor unit according to the invention consist in that the extension of the housing consisting at least in sections of a heat-conducting material is firmly connected to the housing consisting at least in sections of a heat-conducting material, in order to enable a heat-exchange.

Still further embodiments of the sensor unit according to the invention consist in that the electronics module or individual components of the electronics module are in direct contact with the heat-conducting material of the extension of the housing.

Still further embodiments of the sensor unit according to the invention consist in that the extension of the housing comprises an additional cavity, wherein the additional cavity is closed in itself.

Still further embodiments of the sensor unit according to the invention consist in that the measuring cell is of the type capacitive diaphragm gauge or of the type optical diaphragm gauge.

It is expressly pointed out that the previous embodiments are arbitrarily combinable. Only those embodiments or their combinations, respectively, are excluded that otherwise would result in contradictions.

BRIEF DESCRIPTION OF THE DRAWINGS

The present invention is further explained on the basis of embodiments shown in figures. It is shown in.

DETAILED DESCRIPTION OF THE PREFERRED EMBODIMENTS

Figure 1:
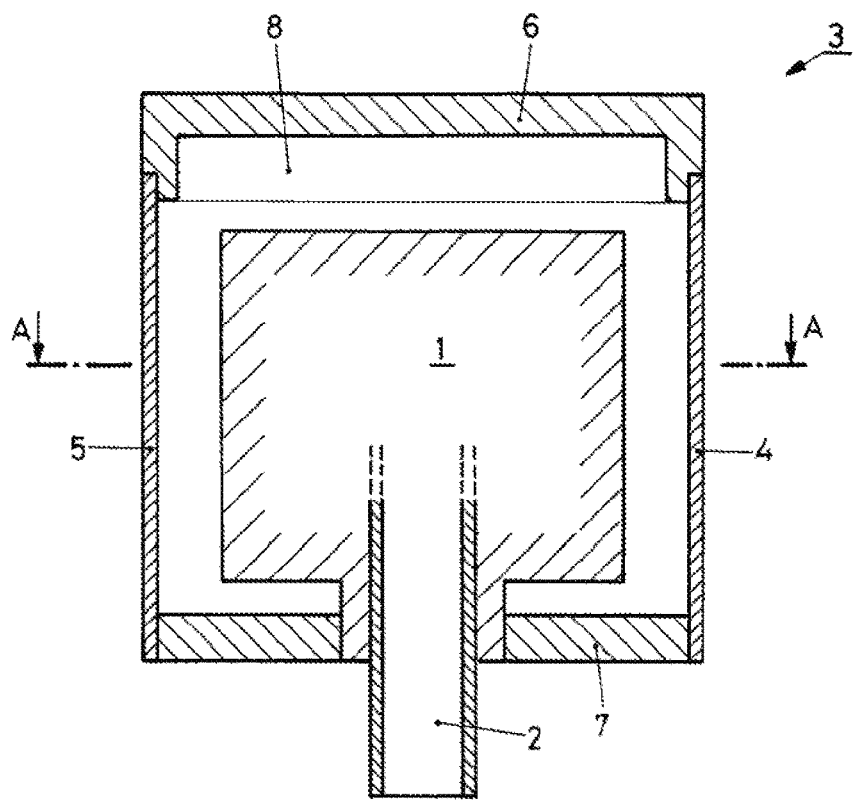
FIG. 1 a longitudinal section through a first embodiment of a sensor unit according to the invention, FIG. 2 a cross section along a section plane A-A through the embodiment according to FIG. 1

FIG. 1 shows a first embodiment of the sensor unit according to the invention in a longitudinal section. The sensor unit consists of a measuring cell 1 with an access channel 2 that is connected to a process chamber (not shown in FIG. 1), in order to be able to determine the pressure conditions in the process chamber by the measuring cell 1. As has already bee explained in the introduction of the description, the measuring cell 1 is operated at elevated temperature—for example, in a range of 45° to 100° Celsius, maximally up to 600° Celsius. In certain applications, the measuring cell 1 is additionally heated by means of heating elements (not shown in FIG. 1), in order to raise the temperature of the measuring cell 1 above a condensation temperature of the involved substances in the process chamber. Only with this it is made possible to keep the substances from the sensitive parts of the measuring cell 1. In this regard, reference is made to the publication of the patent application WO 2007/019714 A1, which forms an integral part of the description of the present invention.

In FIG. 1 solely a single access channel 2 is shown. However, it is conceivable that—depending on the application—several access channels are provided. Moreover, signal lines for the measuring signals (optical or electrical) and supply lines to and from the measuring cell are guided in an access channel as well.

As further can be seen from FIG. 1 the sensor unit comprises a housing 3 that essentially is guided around the measuring cell 1, but does not come into contact with the latter except from an area of the access channel 2. As a result a cavity 8, which is closed in itself, is created between the measuring cell 1 and the housing 3.

The housing 1 consists of lateral walls 4 and 5, a cover element 6 and a bottom element 7, through which the access channel is guided. Whereas the lateral walls 4 and 5 consist of a heat-conducting material, as for example a metal, particularly aluminum, the cover element 6 and the bottom element 7 consist of a material that shows a low thermal conductivity. As material for the cover element 6 and the bottom element 7 a polymer, in particular PPS polyphenylene sulfide, is proposed.

In an embodiment of the present invention it is provided that the cavity 8 is filled with air. An opening between the cavity 8 and the ambient atmosphere is not intended in this case either (and should not be present in order not to let a convection develop inside the cavity, for reasons of isolation), but the cavity 8 does not need to be gas-tight against the ambient atmosphere.

In a further embodiment of the present invention it is provided to evacuate the cavity 8 to a certain degree. In this embodiment the cavity 8 needs to be gas-tight against the ambient atmosphere, which together with further necessary components, such as a vacuum pump, leads to a certain increase in cost of the product.

Finally, the possibility of filling the cavity 8 with a gas, in particular with an inert gas, is proposed.

Whereas the non-heat-conducting parts of the housing, such as cover element 6 and bottom element 7, do not have a balancing effect onto the temperature conditions in the sensor unit, the parts consisting of heat-conducting material, such as the lateral walls 4 and 5, have a balancing effect. This is apparent particularly from FIG. 2, in which a cross section along the section line A-A according to FIG. 1 is shown. From this it becomes apparent that there are areas, particularly in case of surfaces of measuring cell 1 and housing 3 not running in parallel, in which areas the distance between the surfaces of the measuring cell 1 and the inner wall of the housing is smaller (e.g. in the center of the side of the housing) than in other areas (e.g. in the corners of the housing). Thus, a heat flow in direction 9 occurs, provided that the lateral walls 4 and 5 (as well as both the further lateral walls) consist of a heat-conducting material, for example a metal, in particular aluminum. The temperature peaks in the centers of the side are thus distributed over the respective total lateral surface.

Figure 2:
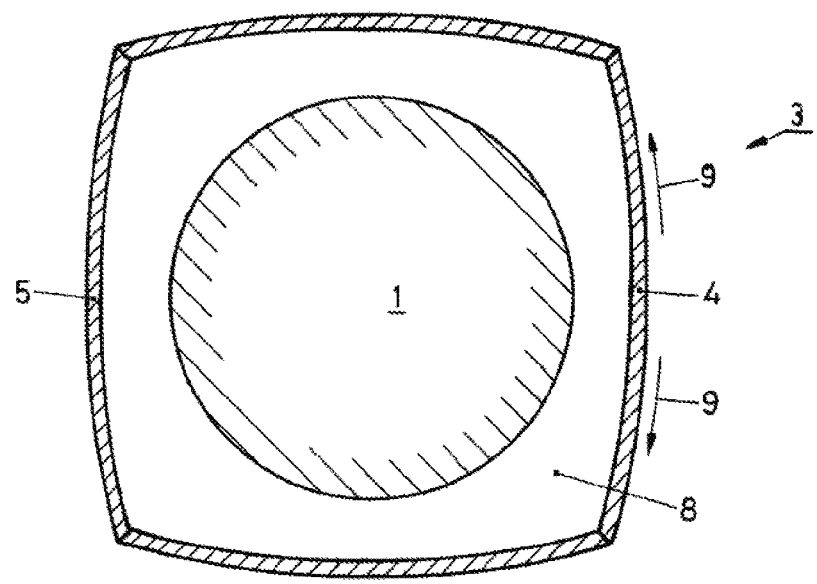
Figure 3:
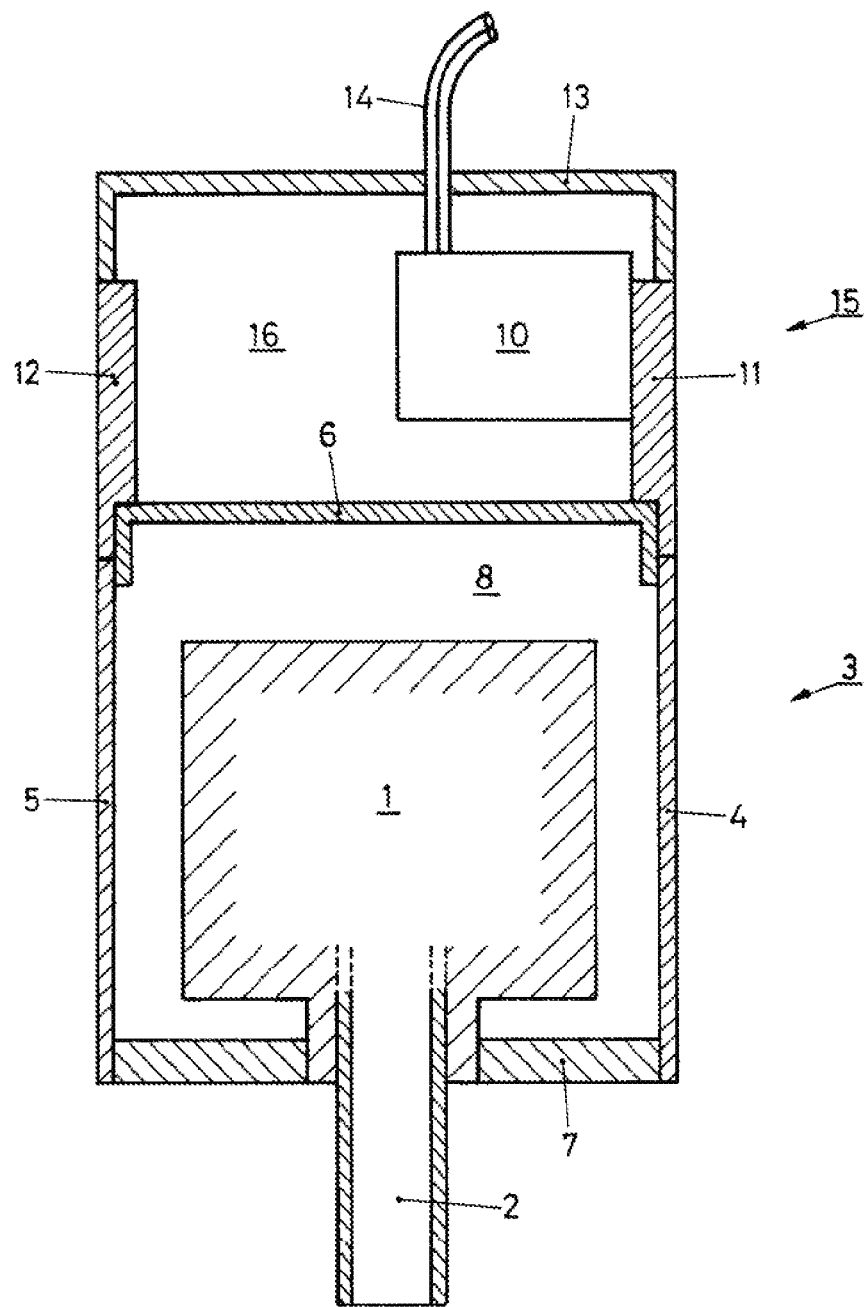
FIG. 3 a longitudinal section through a second embodiment of the sensor unit according to the invention and FIG. 4 a cross section according to FIG. 2 through a third embodiment of the sensor unit according to the invention.

FIG. 3 shows a further embodiment of the present invention. In essence, the embodiment according to FIG. 3 differs from that according to FIG. 2 in that in addition to the measuring cell 1 with the housing 3 there is provided an extension 15 of the housing, which is connected to the housing 3. The extension 15 of the housing comprises the additional lateral walls 11, 12 and a further cover element 13. An additional cavity 16 present in the extension 15 of the housing has the same properties and the same constitution as the cavity 8. A repetition of these properties is omitted at this point.

In the additional cavity 16 the sensor electronics, such as power supply, control, etc. is contained, which subsequently is collectively referred to as electronics module 10.

As can be seen from FIG. 3, the extension 15 of the housing is connected to the housing 3 flush with the surface. The extension 15 of the housing may also be offset relative to the housing 3.

The additional lateral walls 11 and 12 on the other hand may consist of a heat-conducting material, for example a metal, in particular aluminum. The electronics module 10 may be in contact with the additional lateral wall 11 for the purpose of removing heat, in order to guarantee a good removal of lost heat from electronic components of the electronics module 10 to the ambient atmosphere.

From FIG. 3 it can be seen that the additional lateral walls 11 and 12 of the extension 15 of the housing adjoin to the lateral walls 4 and 5 of the housing 3, whereby a heat exchange between the housing 3 and the extension 15 of the housing is possible. It is as well conceivable, for example, that the lateral walls 4 and 5 are formed in one piece with the respective additional lateral walls 11 and 12.

As already the cover element 6, which is now arranged between the cavity 8 and the additional cavity 16, also the further cover element 13 may consist of non-heat-conducting material. This in particular if—as can be seen in FIG. 3—a feed-through 14 for cables or the like is provided outward across the further cover element 13. Such feed-throughs, by the way, may be provided, if necessary, across the cover element 6, too, although this has not been shown in the embodiments according to FIGS. 1 and 3.

Figure 4:
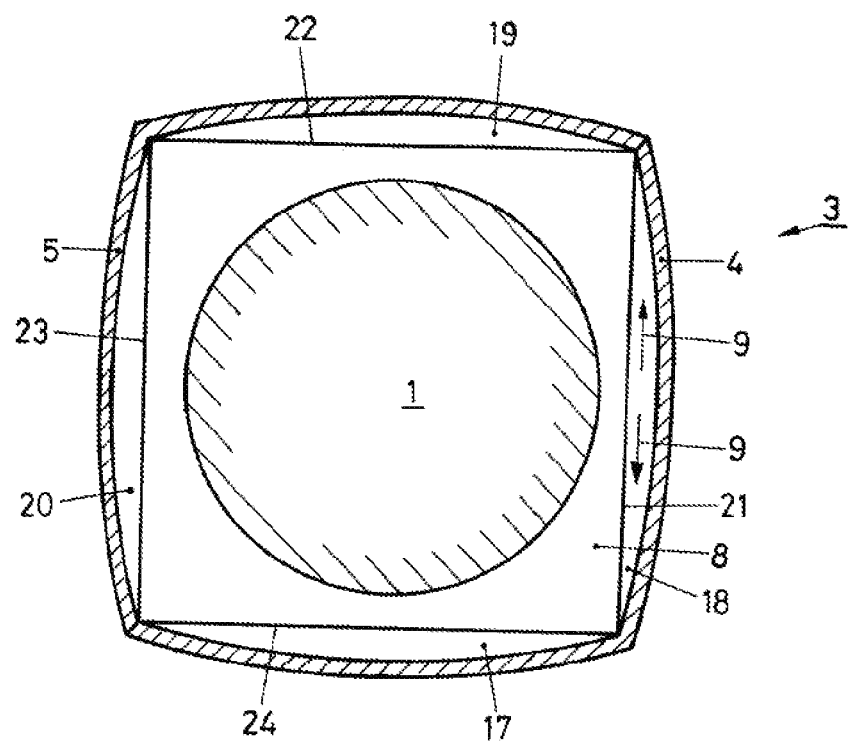

In FIG. 4 a cross section through a third embodiment of the sensor unit according to the invention is shown. Again, a cavity 8 is provided between the housing 3 and the measuring cell 1, which cavity however, in contrast to the embodiment shown in FIG. 2, is divided by intermediate walls 21, 22, 23, 24 running in straight lines between the corners of the housing 3, such that besides the cavity 8 additional cavities 17, 18, 19 and 20 are formed. The intermediate walls 21 to 24 are made of a thermally conductive material, in particular a metal, for example aluminum, so that the heat from the temperature peaks in the central region of the intermediate walls 21 to 24 can flow off in direction 9, as already explained on the basis of the embodiment shown in FIG. 2. For the lateral walls 4 and 5 of the housing 3 as material both a non-heat-conducting polymer (for example the mentioned PPS polyphenylene sulphide) as well as a heat-conducting metal (for example aluminum) may be used.

The invention claimed is:

1. Sensor unit comprising:
   a measuring cell (1) with at least section-wise heat-conducting surface,
   a housing (3; 4, 5, 6, 7), in which the measuring cell (1) for the most part is contained, and
   at least one access channel (2) to the measuring cell (1), characterized by
   a cavity (8) that is confined for the most part by an outer surface of the measuring cell (1) and a wall of the housing (3, 4, 5, 6, 7) facing towards the surface of the measuring cell (1),
   wherein the cavity (8) is closed.

2. Sensor unit according to claim 1, characterized in that the at least one access channel (2) is guided through the housing (3; 6, 7) in an area that consists of a polymer, wherein the polymer preferably is PPS polyphenylene sulfide.

3. Sensor unit according to claim 1, characterized in that the housing (3; 4, 5) consists at least in sections of a heat conducting material, wherein the heat conducting material is preferably aluminum.

4. Sensor unit according to claim 1, characterized in that the cavity (8) is gas-tightly enclosed.

5. Sensor unit according to claim 1, characterized in that the cavity (8) completely comprises the measuring cell (1) except for the at least one access channel (2).

6. Sensor unit according to claim 1, characterized in that the at least one access channel (2) is guided through the housing (3; 6, 7).

7. Sensor unit according to claim 1, characterized in that the measuring cell (1) comprises at least one heating element.

8. Sensor unit according to claim 1, characterized by
   an extension (15) of the housing with an electronics module (10), wherein the extension (15) of the housing is connected with the housing (3; 4, 5, 6), and
   a cover element (6) that is provided between the housing (3; 4, 5, 6) and the extension (15) of the housing, wherein the covering element (6) is spaced from the measuring cell (1).

9. Sensor unit according to claim 8, characterized in that the electronics module (10) is spaced from the thermally insulating cover element (6).

10. Sensor unit according to claim 8, characterized in that the cover element (6) consists of a thermally insulating material, preferably a polymer.

11. Sensor unit according to claim 8, characterized in that the extension (15) of the housing at least in sections consists of a heat-conducting material, preferably a metal.

12. Sensor unit according to claim 11, characterized in that the extension (15) of the housing consisting at least in sections of a heat-conducting material is firmly connected to the housing (3) consisting at least in sections of a heat-conducting material, in order to enable a heat-exchange.

13. Sensor unit according to claim 8, characterized in that the electronics module (10) or individual components of the electronics module (10) are in direct contact with the heat-conducting material of the extension (15) of the housing.

14. Sensor unit according to claim 8, characterized in that the extension (15) of the housing comprises an additional cavity (16), wherein the additional cavity (16) is closed in itself.

15. Sensor unit according to claim 1, characterized in that the measuring cell (1) is of the type capacitive diaphragm gauge or of the type optical diaphragm gauge.

* * * * *